(12) United States Patent
Gouker

(10) Patent No.: US 7,397,141 B2
(45) Date of Patent: Jul. 8, 2008

(54) POWER GENERATOR USING TRACTION DRIVE ELECTRONICS OF A VEHICLE

(75) Inventor: Joel Patrick Gouker, Charlotte, NC (US)

(73) Assignee: Deere & Company, Moline, IL (US)

( * ) Notice: Subject to any disclaimer, the term of this patent is extended or adjusted under 35 U.S.C. 154(b) by 68 days.

(21) Appl. No.: 11/343,129

(22) Filed: Jan. 30, 2006

(65) Prior Publication Data

US 2007/0175680 A1    Aug. 2, 2007

(51) Int. Cl.
F02N 11/06    (2006.01)
(52) U.S. Cl. .................................................. 290/40 C
(58) Field of Classification Search ............... 290/40 R, 290/40 C, 40 B; 903/907, 942, 943, 902; 180/65.6, 65.8, 65.1
See application file for complete search history.

(56) References Cited

U.S. PATENT DOCUMENTS

| 3,889,127 | A | * | 6/1975 | Shibata | 290/14 |
| 5,492,189 | A | * | 2/1996 | Kriegler et al. | 180/65.2 |
| 5,714,851 | A | * | 2/1998 | Antony et al. | 318/148 |
| 6,678,972 | B2 | | 1/2004 | Naruse et al. | 37/466 |
| 6,683,389 | B2 | * | 1/2004 | Geis | 290/40 C |
| 6,691,806 | B2 | | 2/2004 | Wolfgang et al. | 180/6.7 |
| 6,784,563 | B2 | * | 8/2004 | Nada | 290/40 C |
| 6,847,127 | B1 | * | 1/2005 | Lee | 290/40 C |
| 2002/0096866 | A1 | * | 7/2002 | Schmitz et al. | 290/40 C |
| 2003/0102673 | A1 | * | 6/2003 | Nada | 290/40 C |
| 2004/0008530 | A1 | * | 1/2004 | Kitahata et al. | 363/131 |
| 2004/0046394 | A1 | * | 3/2004 | Lim | 290/40 C |
| 2004/0084229 | A1 | | 5/2004 | Stancu et al. | |
| 2005/0109550 | A1 | | 5/2005 | Buglione et al. | |
| 2006/0006009 | A1 | * | 1/2006 | Mennenga | 180/65.3 |
| 2006/0016627 | A1 | * | 1/2006 | Robertson | 180/65.1 |
| 2006/0017290 | A1 | * | 1/2006 | Murty et al. | 290/36 R |

FOREIGN PATENT DOCUMENTS

JP    2000278808 A  * 10/2000

OTHER PUBLICATIONS

Fischer J. W. AC Three-Phase Power Transmission System For Amtrak's New Locomotives F69PH-AC. Proceedings, Technical papers presented at the 1989 IEEE/ASME Joint Railroad Conference (Cat. No. 89CH2749-0), Apr. 25, 1989. pp. 7-11.
European Search Report dated May 18, 2007.

* cited by examiner

Primary Examiner—Julio Gonzalez

(57) ABSTRACT

A system and for generating power associated with a hybrid vehicle or electrically propelled vehicle comprises a mode selector for selecting at least one of an operational mode and a power generation mode. A controller activates one or more switches to disconnect an inverter output from a drive electrical path to a drive motor and to connect the inverter output to a power generation path if the vehicle is in the power generation mode. An inverter inverts a direct voltage signal to an alternating current signal with a desired frequency in the power generation path. A transformer increases a voltage level of the alternating current signal to a desired voltage level.

10 Claims, 4 Drawing Sheets

Fig. 4

POWER GENERATOR USING TRACTION DRIVE ELECTRONICS OF A VEHICLE

FIELD OF THE INVENTION

The present invention relates to a power generator using traction drive electronics of a vehicle, such as a hybrid or electric vehicle.

BACKGROUND OF THE INVENTION

A vehicle may be associated with a power generator for generating electrical power at remote locations. For a hybrid vehicle with an internal combustion engine, the engine may drive an alternator or generator for charging an energy storage device, such as a battery. An inverter may be connected to the direct current (DC) vehicle bus to generate an alternating current (AC) voltage at 50 HZ or 60 Hz for powering one or more auxiliary electrical devices, such as portable electronics equipment, computers, communications equipment, public safety electronics equipment, medical equipment, and military electronics equipment. Similarly, for an electrically propelled vehicle that uses a DC drive motor, an inverter may be connected to the DC vehicle bus to generate an AC voltage at 50 Hz or 60 Hz for powering one or more electrical devices. The inverter may be associated with heat sinks that add weight to the vehicle. Accordingly, there is a need to reduce the overall weight and improve usage of vehicle electronics for electrical power generation, among other things.

SUMMARY OF THE INVENTION

A system and method for generating electrical power associated with a hybrid vehicle or electrically propelled vehicle comprises a mode selector for selecting at least one of a power generation mode and an operational mode of a vehicle. A controller activates one or more switches to disconnect an inverter output from a drive electrical path to a drive motor and to connect the inverter output to a power generation path if the vehicle is in the power generation mode. An inverter inverts a direct current (DC) signal to an alternating current (AC) signal with a desired frequency in the power generation path. A transformer increases a voltage level of the alternating current signal to a desired voltage level.

DESCRIPTION OF THE PREFERRED EMBODIMENT

Figure 1:
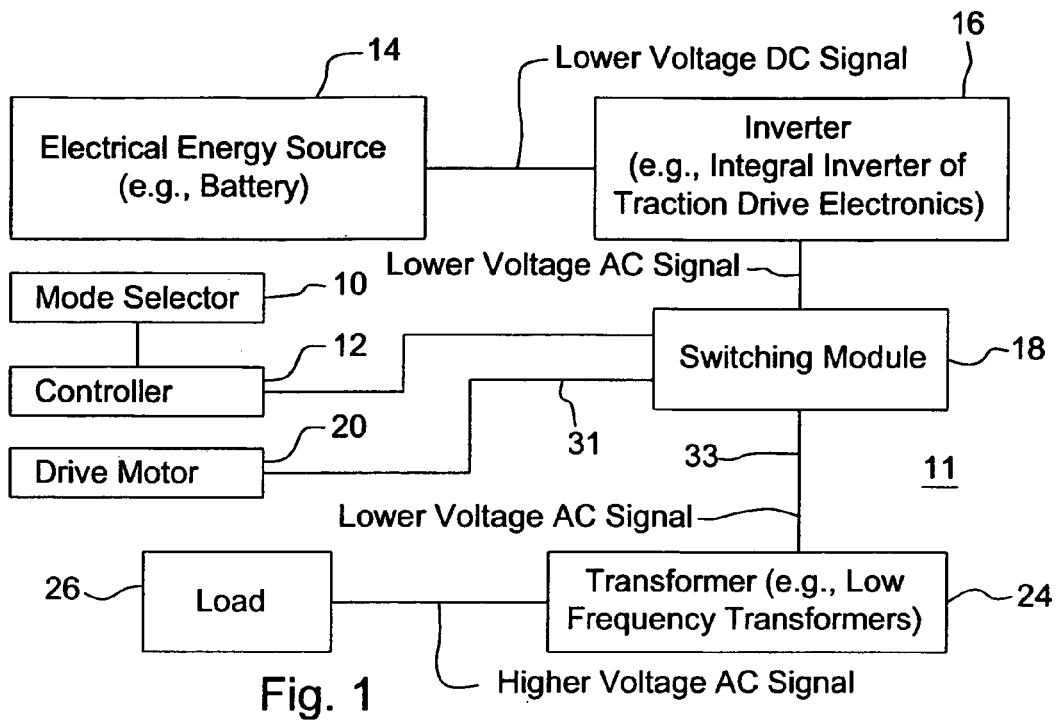
FIG. 1 is a block diagram of a first embodiment of a system for generating power associated with a hybrid or an electrically propelled vehicle.

In accordance with one embodiment, FIG. 1 comprises a system 11 for generating electrical power associated with a hybrid vehicle or an electrically propelled vehicle. A hybrid vehicle means any vehicle that comprises an internal combustion engine and an electric drive motor, where the vehicle is capable of propulsion by the internal combustion engine, the electric drive motor, or both. An electrically propelled vehicle means any vehicle that is capable of propulsion by one or more electric drive motors. The system 11 comprises a mode selector 10 coupled to a controller 12. In turn, the controller 12 is coupled to a switching module 18. An inverter 16 may receive electrical energy from an electrical energy source 14 at an inverter input. An inverter output is coupled to the switching module 18. The switching module 18 has output ports that are coupled or connected to a drive motor 20 (via an electrical path 31) and a transformer 24 (e.g., a low frequency transformer, via a power generation path 33). The output of the transformer 24 may be coupled to a power distribution strip of a vehicle or a load 26.

The electrical energy source 14 may comprise a battery, a fuel cell, a group of capacitors, an alternator, a generator, photovoltaic cell, a solar cell, or any combination of the foregoing items. In one embodiment, the electrical energy source 14 provides a lower voltage direct current (DC) signal. The lower voltage direct current (DC) signal generally has a lower voltage than a peak voltage or root mean squared (RMS) voltage of the higher voltage alternating current (AC) signal as shown in FIG. 1 and the subsequent FIG. 2 through FIG. 4, inclusive. The peak or RMS voltage of the lower voltage AC signal is commensurate in value or greater than that of the lower voltage DC signal.

In FIG. 1, the mode selector 10 selects at least one of a power generation mode and an operational mode. In the power generation mode, electrical energy from the electrical energy source (e.g., lower voltage DC) is modified to provide output electrical energy (e.g., higher voltage AC) at the load 26 or the power distribution strip. In the operational mode, the vehicle is operated under the control of an operator or an unmanned control system that supports unmanned operation of the vehicle. If the vehicle is in the operational mode and/or moving, the mode selector 10 may prevent a user from selecting the power generation mode as a safety measure.

To support the operational mode or a transition thereto, the controller 12 activates one or more switches of the switching module 18 to connect an inverter output (of the inverter 16) from the drive electrical path to the drive motor 20 and to disconnect the inverter output to the power generation path if the vehicle is in an operational mode, as opposed to the power generation mode. However, to support the power generation mode, the controller 12 controls or activates one or more switches of the switching module 18 to disconnect an inverter output from the drive electrical path 31 to the drive motor 20 and to connect the inverter output to the power generation path 33. The inverter 16 inverts a direct voltage signal to an alternating current signal with a desired frequency in the power generation path. The transformer 24 increases a voltage level of the alternating current signal to a desired voltage level. In the power generation mode, the system provides a higher voltage AC signal to the load 26 than a lower voltage DC signal associated with the electrical energy source 14. Although virtually any voltage level may fall within the scope of the invention, in one exemplary embodiment, the desired voltage level may fall within one or more of the following ranges: approximately 110-130 Volts, approximately 220-240 Volts, and approximately 480 Volts (e.g., three phase).

The inverter 16 may be implemented in accordance with various alternative configurations. In a first configuration, the inverter 16 comprises an integral inverter 16 within traction drive controller for inverting the direct voltage signal to an alternating current signal with the desired frequency. The desired frequency may represent one or more of the following: approximately 50 Hertz, approximately 60 Hertz, approximately 400 Hertz, and another suitable frequency value or range that supports the electrical requirements of the load 26.

In a second configuration, the inverter 16 may comprise a switch mode inverter. For example, a switch mode inverter may comprise two power switching transistors that are alternately activated by a resistive biasing network. The emitter and collector of each power switching transistor is coupled in series with a DC electrical energy source (e.g., DC electrical energy source 14) and an input windings of a step-up transformer. An AC signal is available across the output windings of the transformer.

In a third configuration, the inverter 16 comprises a switch mode inverter or another inverter that uses pulse-width modulation (PWM) to produce a generally sinusoidal AC output voltage with attenuation or minimization of undesired harmonics related to the desired frequency. Pulse-width modulation controls the width or duration in which one or more switches are active, while the amplitude of the pulses may be kept at a generally constant voltage via a voltage regulator.

Consistent with the first configuration, some traction drive electronics (e.g., traction drive controllers) have integral inverters (e.g., DC-AC inverter) which are designed to control the speed and operation of one or more drive motors 20 (e.g., drive motors) in response to commands from an operator or data processor. Here, if the inverter 16 (e.g., integral inverter of the traction drive electronics) is used for both power generation in a power generation mode and controlling one or more drive motors 20 in an operational mode, the cost and weight of vehicle electronics (e.g., or heat sinks associated with power switching semiconductors or tubes) could be reduced. Weight reduction of a vehicle is desirable to reduce fuel consumption, increase performance (e.g., acceleration), or both. Moreover, the inverter 16 (integral of the traction drive electronics) is not longer idle or under-utilized during the power generation mode.

Figure 2:
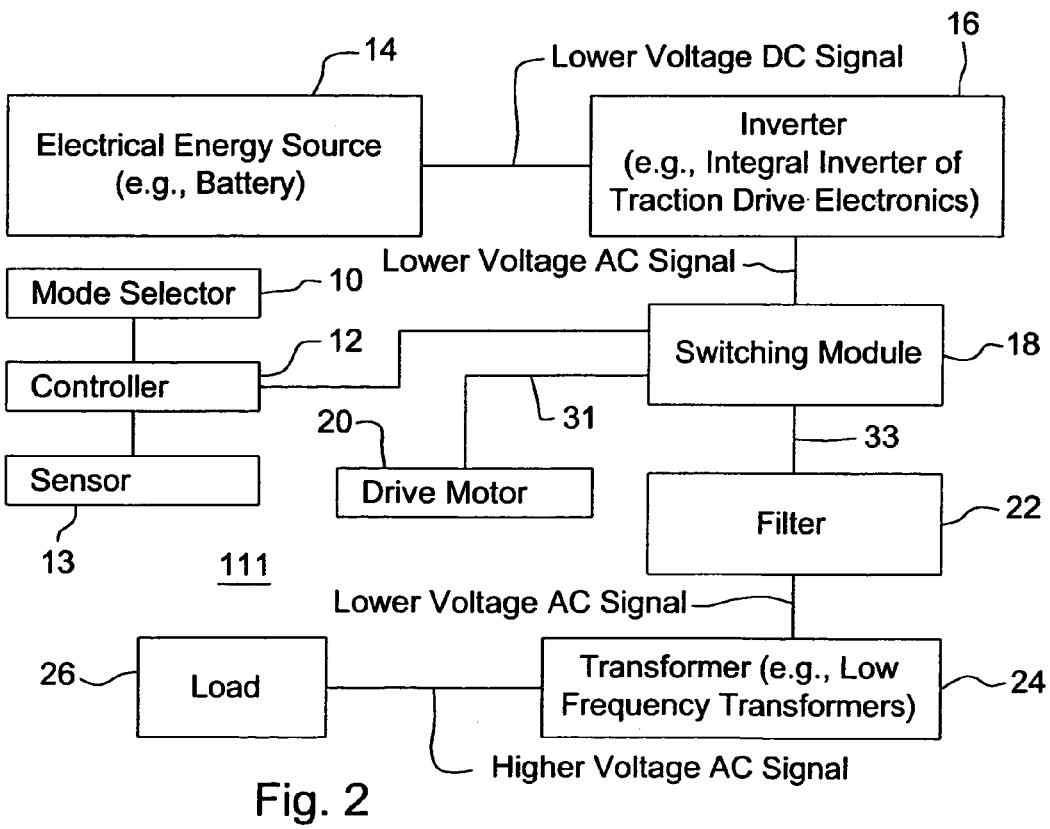
FIG. 2 is a block diagram of a second embodiment of a system for generating electrical power associated with a hybrid or an electrically propelled vehicle.

The system 111 of FIG. 2 is similar to the system 11 of FIG. 1, except filter 22 is added between the switching module 18 and the transformer 24, and the sensor 13 is added. Like reference numbers in FIG. 1 and FIG. 2 indicate like elements.

The filter 22 filters the inverted direct voltage signal to produce a desired waveform. The waveform may represent one or more of the following: a sine wave, a pure sine wave, a square wave, a triangular wave, a rectangular wave, a modified sine wave, a modified square wave, or another waveform. The filter 22 may do one or more of the following: (1) reduce transients where the load 26 has certain inductive characteristics that tend to produce transients, (2) reduce or minimize harmonics associated with the inverter 16 (e.g., switch mode inverter 16), (3) suppress electrical noise or electromagnetic interference from electromagnetic signals within the environment. For suppression of electromagnetic interference (e.g., radio frequency interference or microwave signal interference) the filter 22 may use a feed-through capacitor to act a low-pass filter or attenuator of high frequency signals in the generated power output, for example.

A sensor 13 generates sensor data or a sensor signal indicative of movement (e.g., a motion state) of the vehicle or a non-stationary state of the vehicle. The sensor 13 may comprise a motion sensor, accelerometer, speedometer, ground speed sensor or another sensor that sends a sensor signal or sensor data indicative of movement (e.g., a motion state) or a stationary state of the vehicle. The mode selector 10 may prevent a user from selecting the power generation mode as a safety measure under predefined conditions. The mode selector 10, the controller 12, or both prevents disruption of drive commands or signals to the drive motor 20 when the vehicle is moving (e.g., in the motion state) or operated by an operator in an operational mode. For example, the controller 12 may keep the switching module 18 in a proper state during the operational mode or when the vehicle is in a motion state.

Figure 3:
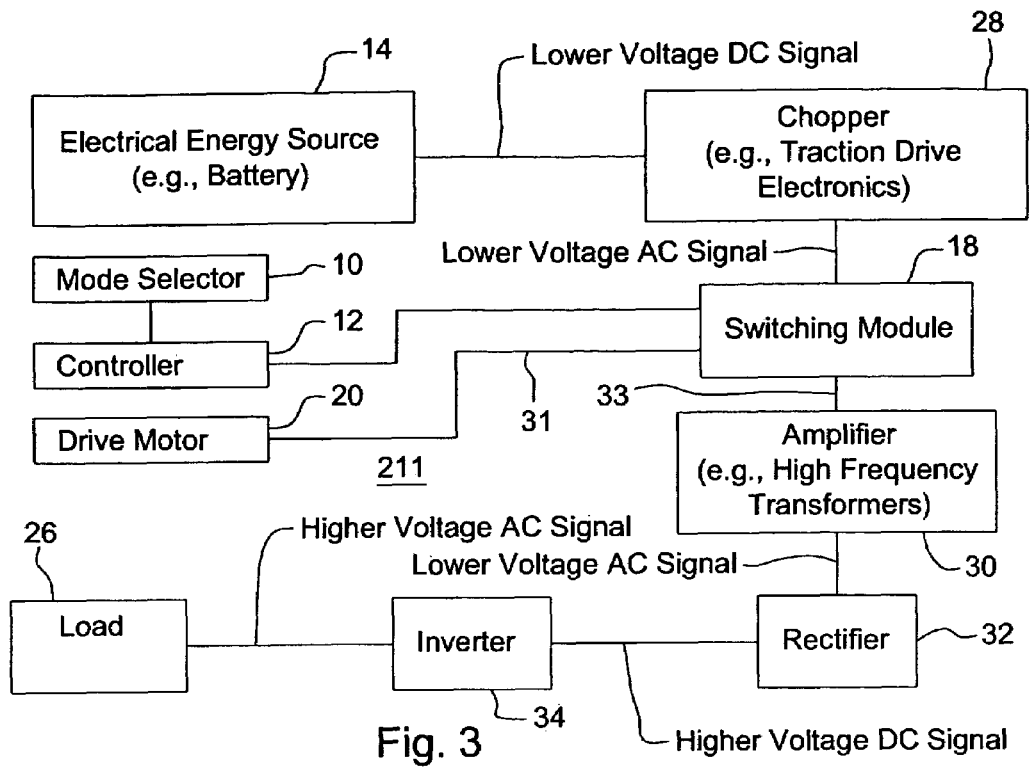
FIG. 3 is a block diagram of a third embodiment of a system for generating electrical power associated with a hybrid or an electrically propelled vehicle.

The system 211 of FIG. 3 comprises a mode selector 10 coupled to a controller 12. In turn, the controller 12 is coupled to a switching module 18. A chopper 28 (e.g., associated with the traction drive electronics or controller) may receive electrical energy from the electrical energy source 14 at a chopper input. The controller 12 controls the switching module 18 to determine whether the chopper output is coupled the drive motor 20 or the amplifier 30 (e.g., high frequency transformer). In turn, the amplifier 30 is coupled to a rectifier 32. An output of the rectifier 32 is fed into an inverter 34. The output of the inverter 34 is associated with a power distribution strip of the vehicle or a load 26.

The mode selector 10 selects at least one of a power generation mode and an operational mode. The controller 12 activates one or more switches of the switching module 18 to disconnect a chopper output from a drive electrical path 31 to a drive motor 20 and to connect the chopper output to a power generation path 33 if the vehicle is in the power generation mode. A chopper 28 chops or modifies a direct current (DC) signal to achieve a pulsed signal with a desired frequency and/or pulse width in the power generation path. An amplifier 30 or transformer processes the pulsed signal to obtain a modified signal (e.g., an amplified signal) with a desired voltage level. For example, in one configuration an amplifier 30 amplifies the pulsed signal to obtain an amplified signal with a desired voltage level. A rectifier 32 rectifies the modified (e.g., amplified signal) to produce a direct current signal at or near the desired voltage level.

In one embodiment, the controller 12 activates one or more switches of the switching module 18 to connect a chopper output from the drive electrical path 31 to the drive motor 20 and to disconnect the chopper output to the power generation path 33 if the vehicle is in an operational mode, as opposed to the power generation mode.

In one configuration, the chopper 28 comprises an integral chopper within traction drive controller for inverting the direct current signal to an alternating current signal with the desired frequency. The desired frequency may comprise one or more of the following: approximately 50 Hertz, approximately 60 Hertz, approximately 400 Hertz, and another suitable frequency or range tailored to meet the requirements of the load 26.

In one embodiment, the chopper 28 may use pulse-width modulation to facilitate inversion of a direct current signal to an alternating current signal. In another embodiment, the chopper 28 comprises an inverter or one or more switching devices (e.g., semiconductors) that are operated to invert the direct current signal to the alternating current signal or a pulse-modulated signal (e.g., a pulse-width modulated signal).

Figure 4:
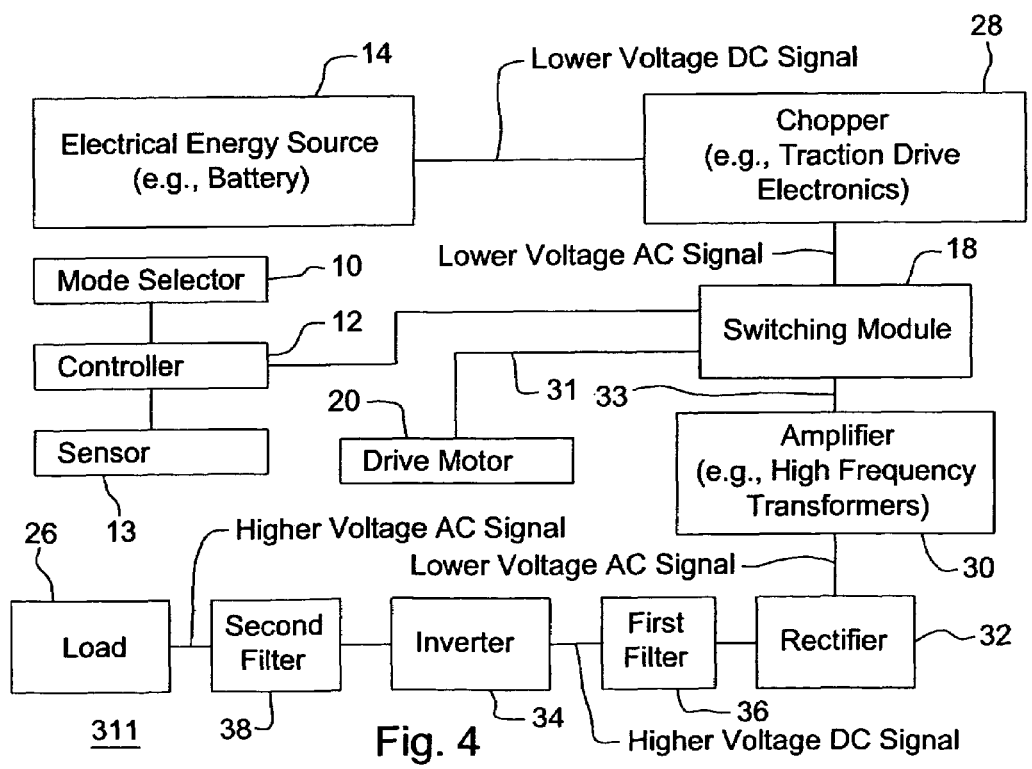
FIG. 4 is a block diagram of a fourth embodiment of a system for generating electrical power associated with a hybrid or an electrically propelled vehicle

The system 311 of FIG. 4 is similar to the system 211 of FIG. 3, except filters (36, 38) are added and sensor 13 is added. The first filter 36 is connected between the rectifier 32 and the inverter 34. The second filter 38 is connected between the inverter 34 and load 26 or the power strip. The system 311 of FIG. 4 comprises a mode selector 10 and a sensor 13 coupled to controller 12. Like reference numbers in FIG. 1 through FIG. 4, inclusive, indicate like elements.

The first filter 36 filters the rectified direct voltage signal to produce a desired waveform or to reduce noise and transients in the direct current signal, for instance. The rectifier 32 may produce voltage notches or variations in amplitude of short duration that may not be acceptable to the load 26 (e.g., load 26 electronics, such as communications equipment or computer equipment); the first filter 36 may condition the signal to reduce or ameliorate the occurrences and/or magnitude of the voltage notches (e.g., observable in the voltage versus time domain expression of the signal).

The second filter 38 filters the output alternating current signal to produce a desired waveform. The second filter 38 may provide general power conditioning to reduce variation in the output signal, to limit harmonic distortion, to limit start-up current, to remove or attenuate voltage spikes or transients, or otherwise protect the load 26 from dirty electrical signals or noisy power signals that detract or degrade performance of the load 26 (e.g., computers, telecommunications equipment, or other sensitive electronics). For example, the second filter 38 may provide voltage regulation or a voltage limiter to limit the voltage to a maximum level and limit voltage spikes or transients that might otherwise be unacceptable to the load 26.

The sensor 13 was previously defined and described in conjunction with FIG. 2; the same description or definition of sensor 13 applies equally to the system 311 of FIG. 4.

Figure 5:
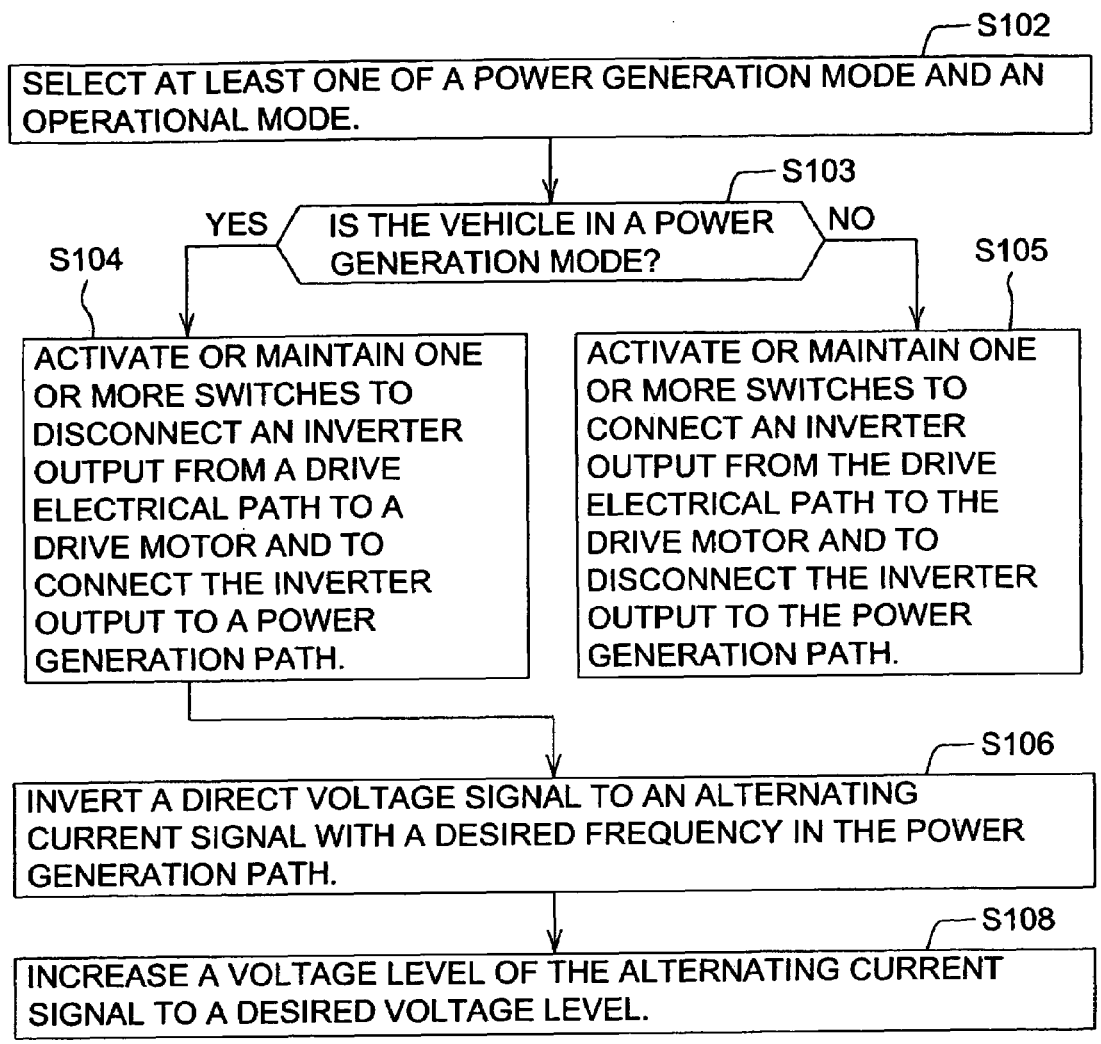
FIG. 5 is a flow chart of one embodiment of a method for generating power associated with a hybrid or an electrically propelled vehicle.

5 discloses a method for generating electrical power associated with a hybrid or electrically propelled vehicle. The method of FIG. 5 may be implemented on any of the embodiments of the systems (e.g., 11, 111, 211 or 311) of FIG. 1 through FIG. 4, inclusive. The method of FIG. 5 begins in step S102.

In step S102, a mode selector 10 supports selection of at least one of a power generation mode and an operational mode. In one embodiment, the mode selector 10 may comprise a switch on the vehicle or instrument control panel of the vehicle. The power generation mode concerns generation of electrical power while the vehicle is generally stationary. In the power generation mode, transmission lines, associated with the transformer 24, the inverter 34, or the second filter 38, may supply electrical power to one or more loads 26. In contrast, the operational mode facilitates movement of the vehicle without the tethering of transmission lines or other connections between the system (11, 111, 211 or 311) and the load 26.

Step S102 may be carried out in accordance with various techniques that may be applied individually or cumulatively. Under a first technique, a user selects a power generation mode via a mode selector 10 or switch on the vehicle or instrument control panel of the vehicle. In the power generation mode, the vehicle is typically stationary and the vehicle is not being driven by a user or an unmanned control system.

Under a second technique, a user selects an operational mode via a mode selector 10 or a switch on the vehicle or instrument control panel of the vehicle. The operational mode is one in which a driver or unmanned control system controls operation of the vehicle or issues commands or otherwise acts to operate or impart motion to the vehicle. During the operational mode, movement of the vehicle occurs, but the movement may be intermittent or discontinuous and associated with stops or stationary periods.

Under a third technique, a user selects a power generation mode and an operational mode. For example, a user selects a power generation mode via the mode selector 10 and then attempts to activate vehicle controls or the mode selector 10 to move the vehicle or operate the vehicle in accordance with the operational mode. If the power generation mode has been selected first, controller 12, the mode selector 10, or both may disable the operational mode until the power generation mode is deactivated. Otherwise, electrical power generation may be disrupted, transmission lines connected to the load 26 or the load 26 itself may be pulled or dragged by the vehicle, and/or operation of the load 26 (e.g., communications equipment, computers, medical equipment or public safety equipment) may be disrupted, among other problems. In one embodiment, the mode selector 10 or the controller 12 may issue a warning or data message to a user via an audible alarm, a visual display, or electromagnetic transmission to indicate that the power generation mode must be deactivated prior to placing the vehicle in the operational mode.

Under a fourth technique, a user attempts to select simultaneously both a power generation mode and operational mode. The mode selector 10 may be associated with a motion sensor, accelerometer, speedometer, ground speed sensor or another sensor 13 that sends a sensor signal or sensor data indicative of movement or a stationary state of the vehicle. If the sensor data or sensor signal indicates movement of the vehicle or a non-stationary state of the vehicle, the mode selector 10, the controller 12, or both may prevent a user from selecting the power generation mode as a safety measure. Accordingly, the mode selector 10, controller 12, or both prevents (a) disruption of drive commands or signals to the drive motor 20 when the vehicle is moving or operated by an operator in an operational mode, (b) keeps the switching module 18 in a proper state during the operational mode, and (c) keeps the switching module in a proper state during the power generation mode. In the fourth technique, the operator of the vehicle is not faced with sudden loss of motive power of the vehicle by inadvertently attempting to activate the electrical power generation mode while already in the operational mode.

In step S103, a controller 12 determines whether the vehicle is in an electrical power generation mode or not. For example, the controller 12 may receive an input from a voltmeter, an ammeter, oscilloscope, spectrum analyzer, or another device that indicates whether a desired output signal (e.g., AC signal with a desired frequency and desired voltage level) is present at an output port of the system (11, 111, 211 or 311). An output port of the power generation system is associated with an output or secondary of the transformer 24 in system 11 (in FIG. 1) and system 111 (in FIG. 2). An output port of the power generation system is associated with the output of the inverter 34 or second filter 38 of system 211 (in FIG. 3) and system 311 (in FIG. 4), respectively. If the vehicle is in a power generation mode, the method continues with step S104. However, if the vehicle is not in a power generation mode, the method continues with step S105.

In step S104 for the system (11 or 111) of FIG. 1 or FIG. 2, a controller 12 activates one or more switches (e.g., semiconductor switches, power transistors or relays) of a switching module 18 to disconnect an inverter output of inverter 16 from a drive electrical path 31 to a drive motor 20 and to connect the inverter output of inverter 16 to an electrical power generation path 33 if the vehicle is in the power generation mode. In step S104 for the system (211 or 311) of FIG. 3 or FIG. 4, a controller 12 activates one or more switches (e.g., semiconductor switches, power transistors or relays) of a switching module 18 to disconnect a chopper output of a chopper 28 from a drive electrical path 31 to a drive motor 20 and to connect the chopper output of chopper 16 to an electrical power generation path 33 if the vehicle is in the power generation mode. However, if the method is not in the power generation mode, step S105 may apply.

In step S105 for the system (11 or 111) of FIG. 1 or FIG. 2, the controller 12 activates or maintains one or more switches of the switching module 18 to connect an inverter output of the inverter 16 to the drive electrical path 31 to the drive motor 20 and to disconnect the inverter output of the inverter 16 to the power generation path if the vehicle is in an operational mode, as opposed to the power generation mode. In step S105 for the system (211 or 311) of FIG. 3 or FIG. 4, the controller 12 activates or maintains one or more switches of the switching module 18 to connect a chopper output of the chopper 28 (or from the drive electrical path 31 to the drive motor 20 and to disconnect the inverter output of the inverter 16 to the power generation path 33 if the vehicle is in an operational mode, as opposed to the power generation mode.

In step S106 for the system (11 or 111) of FIG. 1 or FIG. 2, an inverter 16 inverts a direct current (DC) signal to an alternating current (AC) signal with a desired frequency in the power generation path. For example, the inverting of step S106 may be executed by an integral inverter 16 of a traction drive controller 12. An integral inverter 16 refers to an inverter 16 within or associated with the traction drive controller 12 for inverting the direct voltage signal to an alternating current signal with the desired frequency. Accordingly, the same integral inverter can be used both in the operational mode to control to the drive motor 20 and for converting DC to AC in the electrical power generation mode. The desired frequency may be approximately 50 Hertz, approximately 60 Hertz, and approximately 400 Hertz, or another suitable value.

In step S108, the transformer 24 increases a voltage level of the alternating current signal to a desired voltage level. For example, the transformer 24 may comprise a low frequency transformer that is designed to operate in a range that covers the desired frequency with minimal loss or acceptable attenuation. The transformer 24 may comprise a step-up transformer in which a secondary winding provides a higher output voltage in response to a lower input voltage applied to the primary winding.

In an alternate embodiment, after step S108 or simultaneously therewith, a filter 22 may be used to filter 22 the inverted direct voltage signal to produce a desired waveform. The filter 22 may condition the output signal available at the output port to reduce unwanted harmonics, to regulate the voltage or current, to attenuate voltage spikes, notches or noise, or to accomplish other technical objectives.

Figure 6:
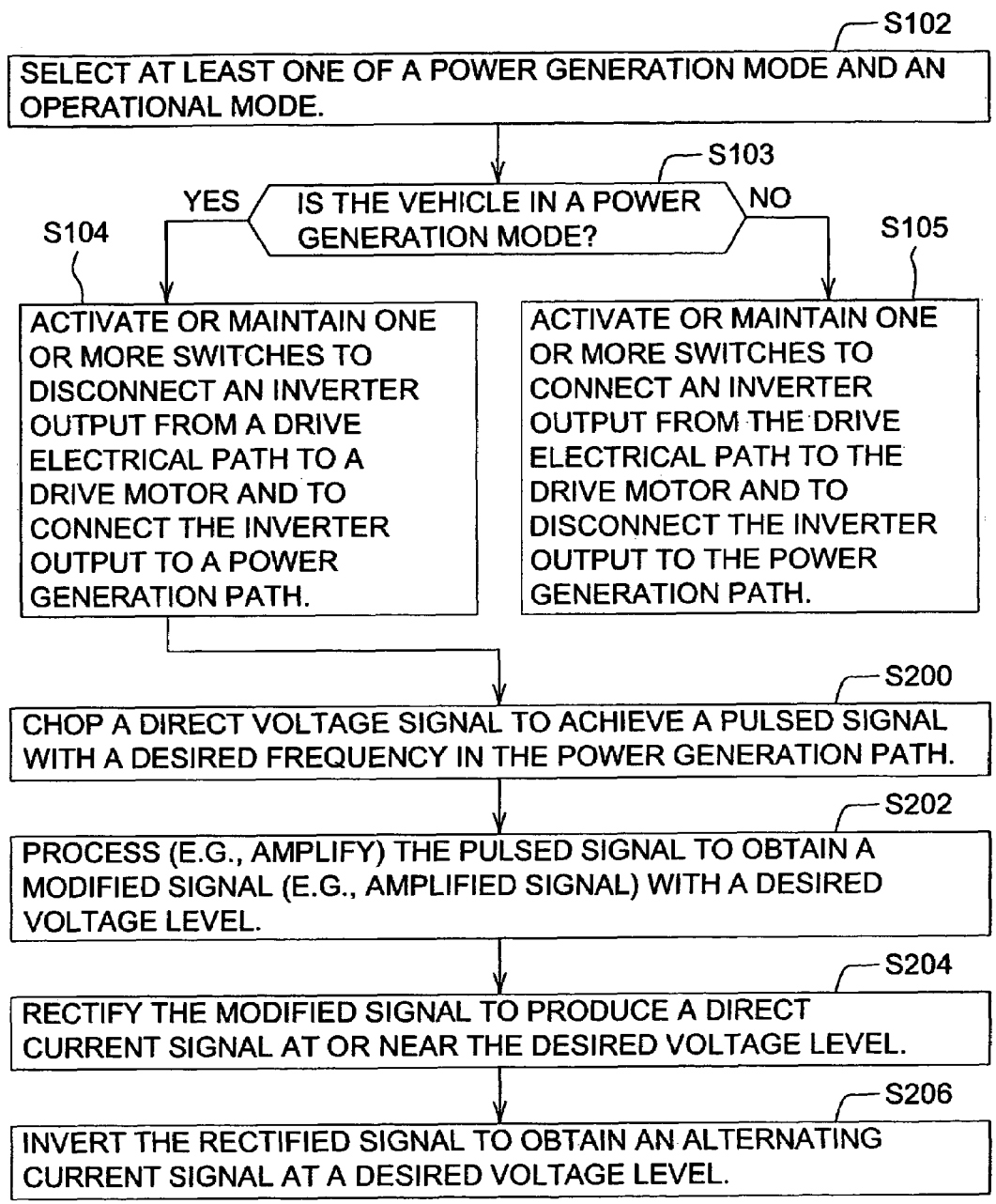
FIG. 6 is a flow chart of another embodiment of a method for generating power associated with a hybrid or an electrically propelled vehicle.

FIG. 6 discloses a method for generating electrical power associated with a hybrid or electrically propelled vehicle. Some steps of FIG. 6, including steps S102, S103, S104, and S105, have all ready been described in conjunction with description of FIG. 5. Like reference numbers in FIG. 5 and FIG. 6 indicate like steps or procedures.

In step S200 after step S104, a chopper 28 or inverter chops or processes a direct voltage signal to achieve a pulsed signal with a desired frequency and/or pulse width in the power generation path.

In step S202, an amplifier 30 or high frequency transformer 24 processes the pulsed signal to obtain a modified output signal with a desired voltage level. Step S202 may be carried out in accordance with various techniques that may be applied alternately, or cumulatively. Under a first technique, an amplifier 30 amplifies the pulsed signal to obtain a modified signal (e.g., an amplified signal) with a desired voltage level. For example, the amplifier 30 may amplify a square-wave signal as the pulsed signal. The amplifier 30 may have a feedback loop, or may not use current or voltage feedback for gain or stability control.

Under a second technique, a high frequency transformer 24 increases or steps up the pulsed signal to a modified signal with a desired voltage level. The high frequency transformer 24 is selected to have a frequency range that is commensurate in scope or matched to that of the frequency of the pulsed signal outputted by the chopper.

In step S204, a rectifier 32 rectifies the amplified signal to produce a direct current signal at or near a desired voltage level. In one embodiment, in step S204 or thereafter, the direct current output signal is filtered to produce an higher voltage direct current signal than a lower voltage direct current input signal provided by the electrical energy source 14 (e.g., battery).

In step S206, an inverter 16 inverts the rectified signal (e.g., higher voltage output signal) to obtain an alternating current signal at a desired voltage level. The inverter 16 may be associated with filtering to condition the alternating current signal in suitable manner for the load 26 (e.g., electronics, communications or computer equipment).

Having described the preferred embodiment, it will become apparent that various modifications can be made without departing from the scope of the invention as defined in the accompanying claims.

The invention claimed is:

1. A method for generating electrical power associated with a hybrid vehicle or electrically propelled vehicle, the method comprising:
   selecting at least one of a power generation mode and an operational mode;
   activating one or more switches to disconnect an inverter output from a drive electrical path to a drive motor and to connect the inverter output to a power generation path distinct from the drive electrical path to the drive motor if the vehicle is stationary and in the power generation mode;
   inverting a direct voltage signal to an alternating current signal with a desired frequency in the power generation path; and
   increasing a voltage level of the alternating current signal to a desired voltage level.

2. The method according to claim 1 further comprising:
   activating one or more switches to connect an inverter output from the drive electrical path to the drive motor and to disconnect the inverter output to the power generation path if the vehicle is in an operational mode, as opposed to the power generation mode.

3. The method according to claim 1 wherein the inverting is carried out by using an integral inverter within traction drive controller for inverting the direct voltage signal to an alternating current signal with the desired frequency.

4. The method according to claim 1 wherein the desired frequency is selected from the group consisting of approximately 50 Hertz, approximately 60 Hertz, and approximately 400 Hertz.

5. The method according to claim 1 further comprising:
   sensing if the vehicle is in a motion state;
   preventing a transition from the operational mode to the power generation mode if the vehicle is in the motion state.

6. A system for generating electrical power associated with a hybrid vehicle or electrically propelled vehicle, the system comprising:
   a mode selector for selecting at least one of a power generation mode and an operational mode;

a controller for activating one or more switches to disconnect an inverter output from a drive electrical path to a drive motor and to connect the inverter output to a power generation path distinct form the drive electrical path to the drive motor if the vehicle is stationary and in the power generation mode;

an inverter for inverting a direct voltage signal to an alternating current signal with a desired frequency in the power generation path; and a transformer for increasing a voltage level of the alternating current signal to a desired voltage level.

7. The system according to claim 6 wherein the controller activates one or more switches to connect an inverter output from the drive electrical path to the drive motor and to disconnect the inverter output to the power generation path if the vehicle is in an operational mode, as opposed to the power generation mode.

8. The system according to claim 6 wherein the inverter comprises an integral inverter within traction drive controller for inverting the direct voltage signal to an alternating current signal with the desired frequency.

9. The system according to claim 6 wherein the desired frequency is selected from the group consisting of approximately 50 Hertz, approximately 60 Hertz, and approximately 400 Hertz.

10. The system according to claim 6 further comprising:

a sensor for sensing if the vehicle is in a motion state;

the controller preventing a transition from the operational mode to the power generation mode if the vehicle is in the motion state.

* * * * *